(12) United States Patent
Ries et al.

(10) Patent No.: US 7,546,180 B1
(45) Date of Patent: Jun. 9, 2009

(54) POSITION DETERMINATION OF MULTIPLE MECHANISMS SHARING A COMMON AXIS OF MOTION IN A ROBOTIC TAPE LIBRARY

(75) Inventors: James Lee Ries, Boulder, CO (US); Robert Creager, Berthoud, CO (US); John R. Kostraba, Jr., Phoenix, AZ (US); Robert L. Billington, Lyons, CO (US)

(73) Assignee: Storage Technology Corporation, Louisville, CO (US)

( * ) Notice: Subject to any disclaimer, the term of this patent is extended or adjusted under 35 U.S.C. 154(b) by 881 days.

(21) Appl. No.: 11/025,027

(22) Filed: Dec. 29, 2004

(51) Int. Cl.
*G11B 15/68* (2006.01)
(52) U.S. Cl. .................... 700/248; 414/273
(58) Field of Classification Search ........... 700/245, 700/57, 64, 215, 218, 254; 235/383, 385; 369/30.31, 30.36, 92, 69, 71; 702/105; 901/46, 901/50; 414/273, 850; 360/98.04
See application file for complete search history.

(56) References Cited

U.S. PATENT DOCUMENTS

| | | | | | |
|---|---|---|---|---|---|
| 5,285,333 | A | * | 2/1994 | Barr et al. | 360/92.1 |
| 5,418,971 | A | * | 5/1995 | Carlson | 710/24 |
| 5,546,366 | A | * | 8/1996 | Dang | 369/30.39 |
| 5,781,367 | A | * | 7/1998 | Searle et al. | 360/92.1 |
| 6,512,963 | B1 | * | 1/2003 | Felde et al. | 700/215 |

* cited by examiner

*Primary Examiner*—Dalena Tran
(74) *Attorney, Agent, or Firm*—Brooks Kushman P.C.

(57) ABSTRACT

A system and method for determining relative positions of robots constrained to move along a common axis of motion, where a controller of the system has no prior knowledge of the relative positions. The robots are ordered to move in defined directions and distances and report their ability to move in the desired directions. From this information, a controller of the system can determine their relative positions.

20 Claims, 7 Drawing Sheets

POSITION DETERMINATION OF MULTIPLE MECHANISMS SHARING A COMMON AXIS OF MOTION IN A ROBOTIC TAPE LIBRARY

BACKGROUND OF THE INVENTION

1. Field of the Invention

The present invention relates generally to robotic storage libraries, and specifically to determining relative positions of robotic access mechanisms that share a common axis of motion in the library.

2. Background of the Invention

Storage libraries are collections of media volumes (e.g., reels of magnetic tape) used for storing and accessing information. A typical storage library has many media volumes that contain information, drives for reading from and writing to the volumes, and some mechanism for moving volumes from their individual storage slots to a drive and back again. Modern storage libraries often employ one or more "robotic pickers" that are designed to move media volumes within the library from storage to drive and back again.

In many storage libraries, these robots are devices that move along a predetermined pathway, such as a rail that passes a specific set of media volumes. By translating the robot along the rail, various volumes can be reached and moved by the robot. Often, in order to facilitate faster access to data on volumes of the library, more than one robot is employed. In some cases, these multiple robots, or other redundant access mechanisms, may share a common axis of movement, e.g., they move along the same physical rail.

Typically, when more than one robot shares a rail or other common axis of movement, specific hardware indicators are used to identify where the robots are with respect to one another; such hardware indicators must be correctly set during robot installation, designating the relative positions of the robots. In other words, one robot of a pair will be the "right" robot while the other will be the "left" robot; if there are more than two on the rail, they will be the "second from left", "third from left", etc. The order must be kept straight at installation in order for the system to work correctly. Failure to install the robots in their correct relative position will result in malfunction of the storage system. Further, when a robot fails, it is often removed from the system for servicing and replaced later. In such cases, the technician must be careful to restore the robots in their correct relative positions once again, loading the robots onto the rail in the same order as they were previously. This can result in confusion and can increase the duration and frequency of service calls.

Therefore, the present state of the art would benefit from a system to determine relative positions of robots in a storage library without the use of specific hardware indicators or unique "left/right/other" robots.

SUMMARY OF THE INVENTION

The present invention teaches a system and method for determining relative position of robots sharing a common axis of motion that is generic and transparent to the robots themselves. The software of a library controller initializes the robots without knowing their relative positions with respect to one another. By driving each robot in a predetermined pattern and receiving a response from each robot (for example, whether or not a given robot is able to move in a given direction when so instructed), the controller is able to identify the relative positions of the robots.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention is hereinafter described as a process for identifying an order for a number of robots from left-to-right or right-to-left. The process is designed for use in a library for tape or other storage media, in which two or more robotic devices, which are used for accessing the media, share a common axis of motion (e.g., run on a single rail). The process is used to determine an order of the devices without the need for a specific hardware indicator that is set during robot installation. In this application, a robot or robotic mechanism is defined to be a mechanical device that is controlled electronically by a processor that provides instructions for movement.

Figure 1:
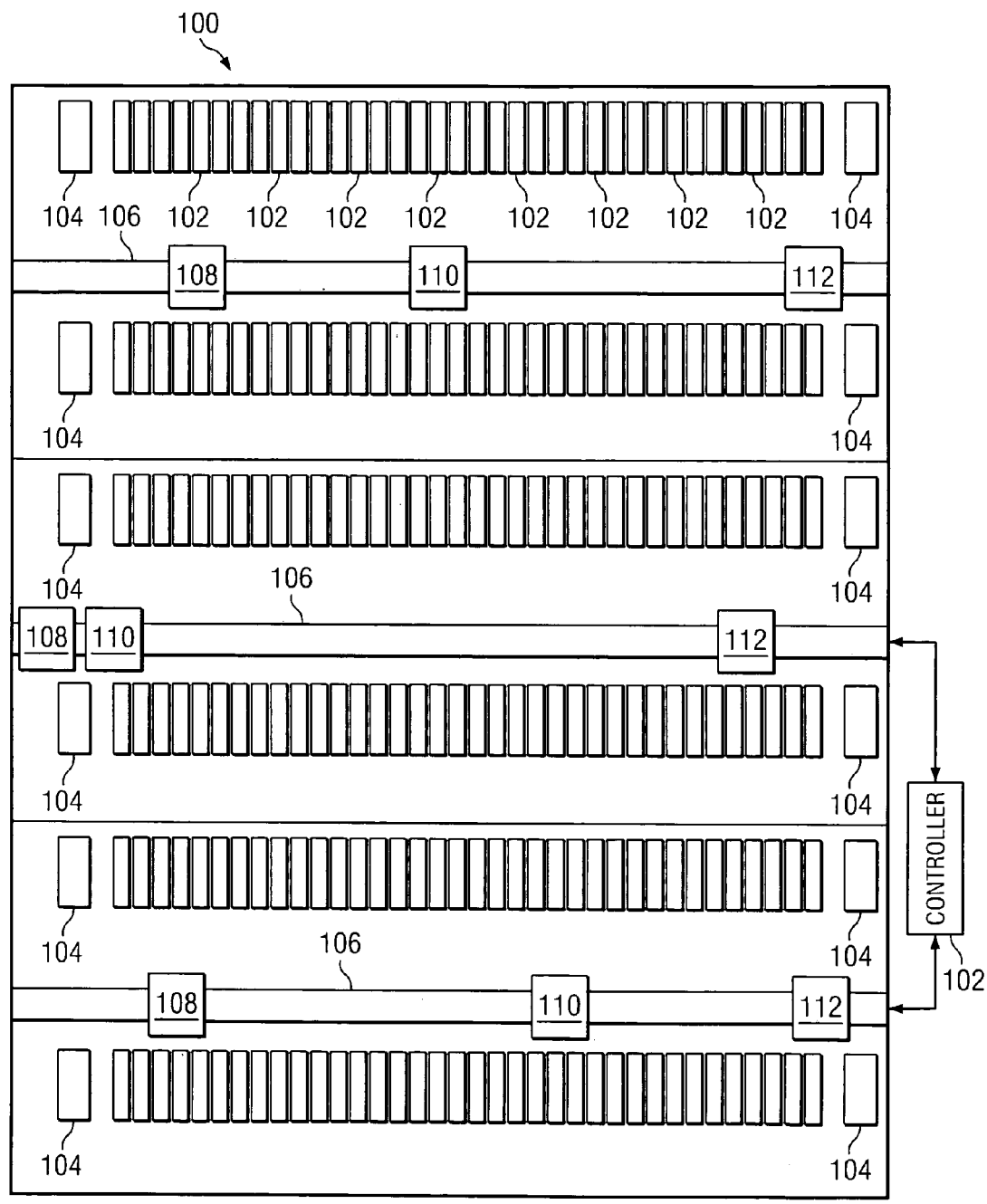
FIG. 1 depicts a storage system consistent with implementing a preferred embodiment of the present invention.

FIG. 1 shows storage library 100, which is consistent with implementing a preferred embodiment of the present invention. Although this discussion refers to a storage library for magnetic tapes, other types of storage libraries or facilities using multiple robots on a common axis of motion are also consistent with implementing the present innovations. Storage library 100 provides storage for a number of tapes 102, which are arranged in linear arrays or rows. In this embodiment, a tape drive 104 is placed at both ends of each row. A rail 106 runs between every two rows of tapes 102, with one or more robotic mechanisms 108, 110, 112 arranged to travel along rail 106 and carry tapes 102 between their respective storage locations and a tape drive 104. Controller 114 controls the movement of robots 108, 110, 112. It is also possible to use the disclosed methods in a library that is arranged in a circular design. In this case, there would be no end stops, so the methods would be limited to versions that did not require moving to an endstop.

Sequencing Process—Two Robots, Version I

Figure 2A:
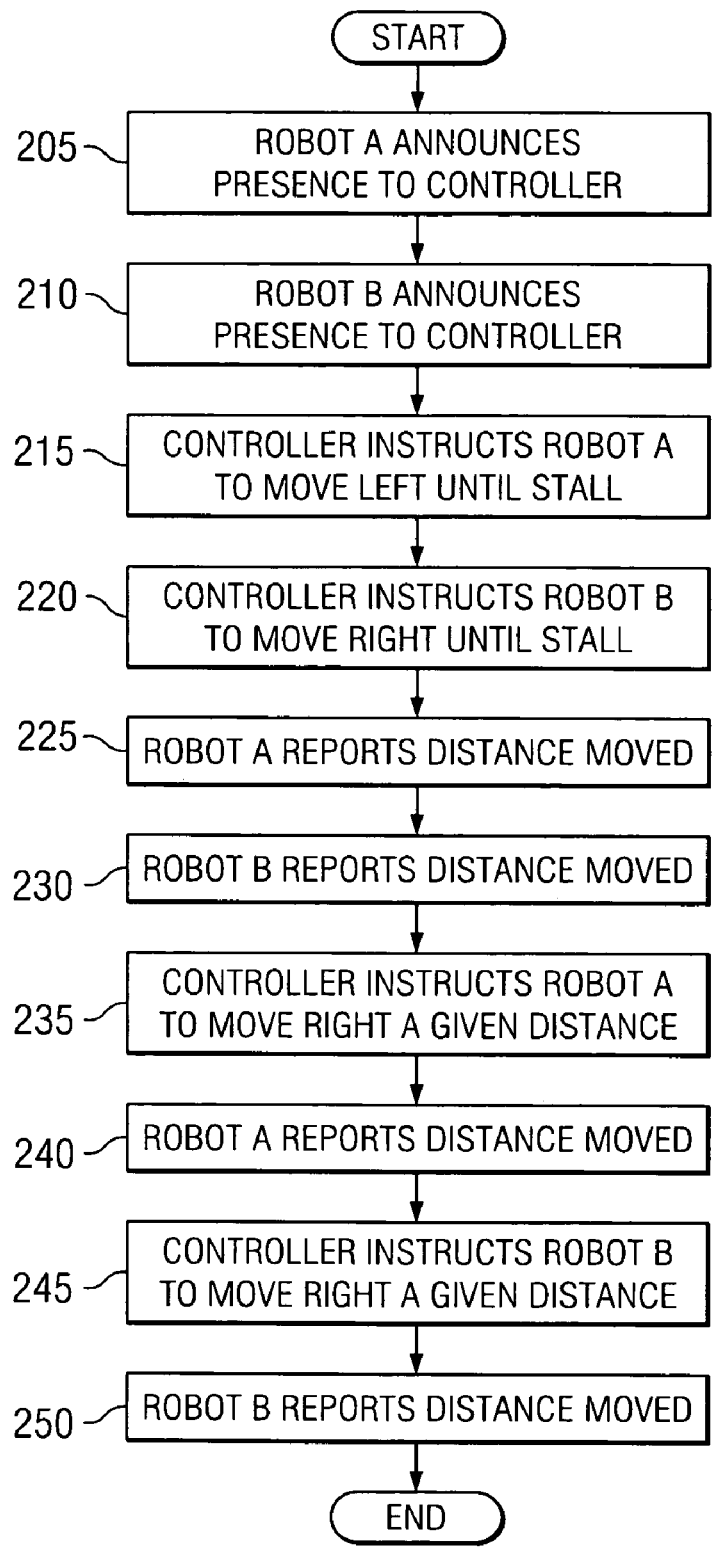
FIGS. 2A and 2B depict flow charts with process steps for implementing embodiments of the invention in which only two robots are present.

This discussion begins with the special case where there are only two robots working on a single section of rail. This is the simplest case and currently the most common, although the invention is not limited to only two robots. With reference to FIG. 2A, this flowchart shows the sequence of actions occurring between a library controller and two robots, designated robot A and robot B. The process begins with the system initializing with robots A and B in place on the rail, but with their relative positions unknown. To begin, robot A announces its presence to the library controller (step 205). Robot B also announces its presence to the library controller (step 210). This announcement can include, for example, identification of the robot by a unique serial number, and a height at which it resides in the library. Next, the library controller issues a command to robot A to move left until it stalls in a given direction (step 215). The controller also orders robot B to move right until it stalls (step 220). Note that it is not important at this point which robot is told to move right and which is told to move left; they are simply instructed to move in opposite directions. Each robot then responds with the actual number of columns it moved; here robot A is shown responding in step 225 and robot B is shown as responding in step 230, although the order of response is not important. The controller next orders robot A to move one unit right (step 235). Robot A responds with the distance it actually moved (step 240). The controller instructs robot B to move right (step 245) and robot B responds with the distance it actually moved (step 250). The controller now has the information necessary to determine the relative positions of robots A and B. This can be more clearly understood by tracking the movements of the two robots visually.

Figure 3A:
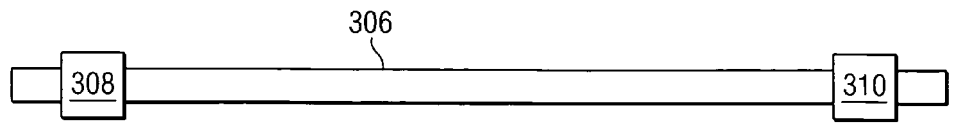
FIGS. 3A-3G depict the positions of two robots as they are moved according to the algorithm of FIG. 2A, with the two paths showing robot A in left and right positions.
Figure 3B:
Figure 3C:
Figure 3D:
Figure 3E:
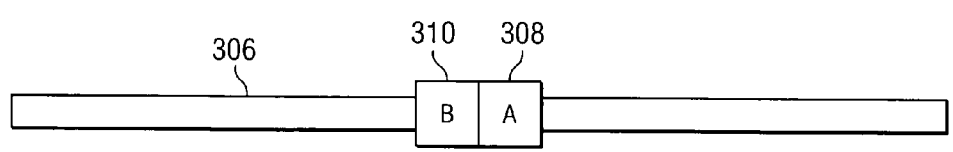
Figure 3F:
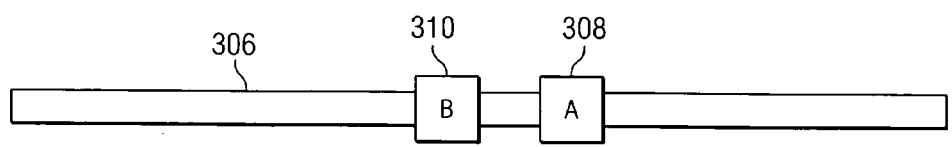
Figure 3G:
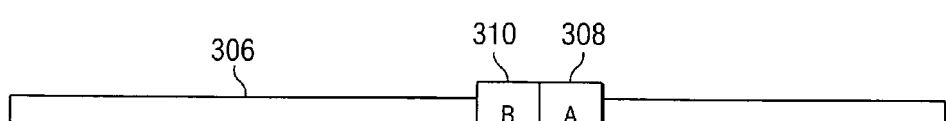

FIGS. 3A through 3G demonstrate possible positions of robots A and B during the course of the instructions disclosed in FIG. 2A. In these figures, portions of the system that are not involved in the movements are eliminated, leaving only rail 306 and robots 308, 310. The two robots 308, 310 are assumed to be in random positions on rail 306 at the beginning of the steps, seen in FIG. 3A. After steps 205 through 220, robots 308, 310 will either be driven to opposite sides of rail 306, as shown in FIG. 3B or they will have met at a point somewhere between their original positions, shown in FIG. 3E, depending on which robot is identified as robot A. The algorithm initially drives robot A to the left while it drives robot B to the right. Therefore, if robot A was the leftmost robot, the robots will be at opposite ends of the rail, as shown in FIG. 3B. Likewise, if robot A was the rightmost robot, the robots will be driven together somewhere along rail 302, as shown in FIG. 3E.

Following first the sequence on the left, when robot A is in the position shown in FIG. 3B and is instructed to move to the right a short distance, e.g., one unit (in step 235), it will be able to do so, as is shown by its shifted position, as shown in FIG. 3C and it will respond with one unit moved. However, when robot B is instructed to move to the right a short distance, e.g., one unit (in step 245), it will be unable to comply and will return an actual distance moved of zero, shown in FIG. 3D by no change from the previous positions. In this instance, the fact that A could move right but B could not showed that A is the leftmost robot.

In the right-hand side, the same sequence of instruction is run with robot A on the right. Here, the initial movement driving robot A to the left and robot B to the right has brought the two robots together somewhere in the middle of rail 302, as shown in FIG. 3E, although the exact location is not necessarily where it is shown here. When robot A is instructed to move to the right (in step 235), it is able to do so and returns a distance moved of 1, shown by its shifted position in FIG. 3F. When robot B is asked to move one unit right (in step 245), this robot is also able to comply, shown by its shifted position in FIG. 3G, and it is able to respond with a distance moved. The fact that both A and B could move right showed that A is the rightmost robot.

One other special case should be mentioned, although it will occur only rarely, if ever. If, in the previous example, robot A is on the far right hand side of rail 302 while robot B is nearby, it is theoretically possible for robot A to become trapped against the right rail by robot B. In this case, neither robot would be able to move right in steps 214 and 218, as they would both be as far right as possible. In this instance, the controller is able to determine that robot B was able to move right in step 208, but robot A was not able to move left because robot was in the way. This fact would show that robot was the rightmost robot.

Sequencing Process—Two Robots, Version II

Figure 2B:
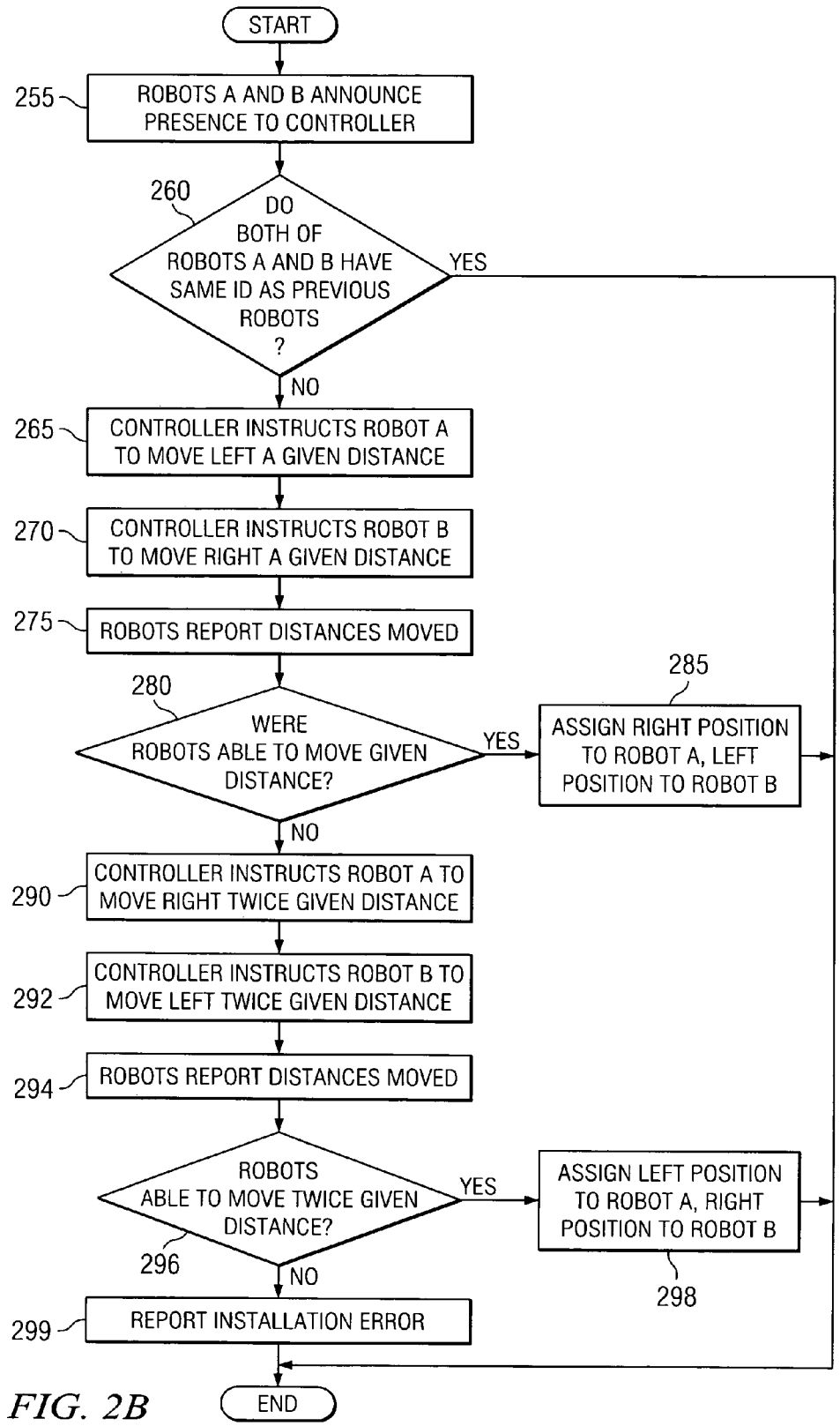

When only two robots are used on a rail, an installation constraint can simplify the process of determining left and right robots, as shown in FIG. 2B. Installation instructions for the robots include the constraint that each robot be installed within a predetermined distance, e.g., nine inches, of an endstop, with one near each end of rail 206. Additionally, unless this is the initial installation, the controller will have previously received instructions to store the identification numbers of the last known robots in the system and their previous left/right status. As the process begins, robots A and B boot up and announce their respective presence (step 255) to the controller. The controller then compare the identification numbers of both robots to the identification numbers of the last known robots to determine if both robots are the same as the last known robots (step 260). If they are, the controller assumes that they have remained in the same positions and the following steps are skipped.

If one or both of the robots is new, the controller must determine their relative positions. The controller instructs robot A to move a given distance to the left (step 265) and instructs robot B to move the given distance to the right (step 270). The given distance will be chosen to be greater than the predetermined distance above.

Both robots A and B report whether or not they were able to move the given distance (step 275). Note that either both robots should be able to move the distance or neither. The controller determines whether the robots were able to move the given distance (step 280). If so, the controller has determined that robot A is the right robot (since it didn't hit an end stop moving right) and robot B is the left robot and will so assign the positions (step 285). If the robots were not able to move the given distance, the controller instructs robot A to move right twice the previously given distance (step 290) while it instructs robot B to move left twice the previously given distance (step 292). The robots will report the respective distances they are able to move (step 294) and the controller determines if they were able to move the requested distances (step 296). This should drive both robots into their respective end stops. If one or both robots were not able to move the requested distance, the controller will assign the left position to robot A and the right position to robot B (step 298) and end. If the robots were able to move the distance, there has been an error in the installation of the robots and that will be reported (step 299), then the process ends.

Sequencing Process—Multiple Robots, Version I

A number of algorithms that can be used with multiple robots will now be discussed. A first example is demonstrated in FIGS. 4A-D, which like FIGS. 3A-3G show only rail 406 and associated robots 408, 410, 412, so that the movement of the robots can be more clearly seen. A first method of determining the positions of robots 408, 410, 412 will now be explained with reference to FIG. 5, which shows a flowchart of the steps, according to an embodiment of the invention. Although this example uses three robots for the purpose of illustration, the algorithm can be used with any number of robots to determine their positions. Prior to beginning the process, the robotic mechanisms will be at random positions, as shown in FIG. 1.

Figure 4A:
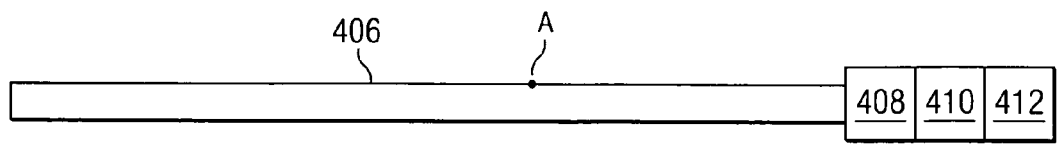
FIGS. 4A-4D depict the positions of three robots at four points during the operation depicted in FIG. 5.
Figure 4B:
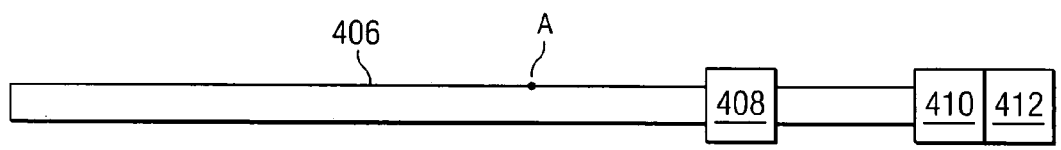
Figure 4C:
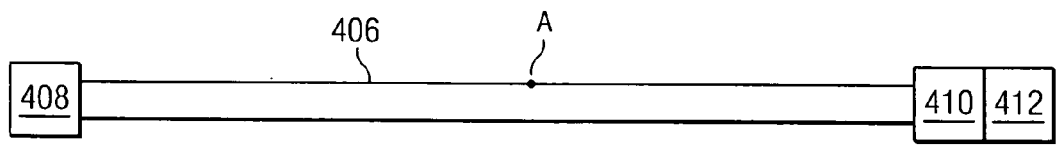
Figure 4D:
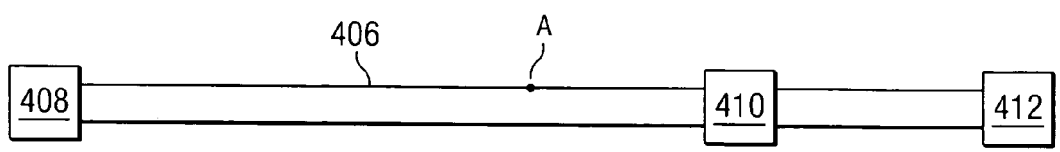
Figure 5:
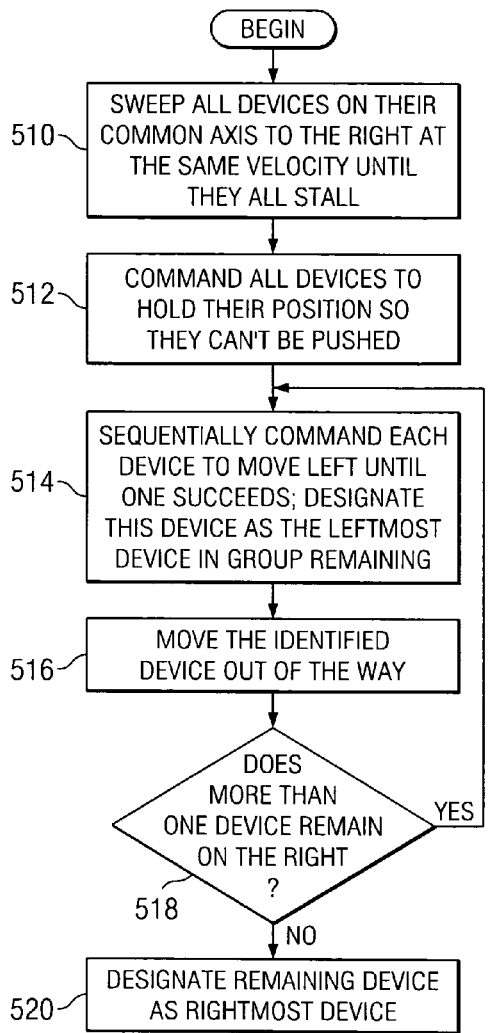
FIG. 5 depicts a flow chart with process steps for implementing an embodiment of the invention.

The process is entered after all robots have been installed and have communicated their presence to the controller. As a first step, the controller commands all of robotic devices 408, 410, 412 to move as far to the right as they can, using the same speed, so that they do not cause harm to each other (step 510). It should be understood that since the devices are constrained to move along a common axis, and can move in only two directions, the designation of 'right' and 'left' is for clarity only. The directions can be reversed and still produce the same results. Once all devices have reached their rightmost limit, the controller instructs all devices to hold their position (step 512), so that they are not movable if another device pushes on them. At this point, the devices are positioned as shown on the second line. The controller then sequentially commands each device to move to the left until one device, in this example, robot 408, is able to move (step 514). The order in which the devices are commanded to move is irrelevant, as long as the controller stops this step when the first device is able to move. For example, looking at FIG. 4A, it would be obvious that in this position, robots 410, 412 would not be able to move, since they are trapped between the end of rail 406 and device 408. However, when device 408 is told to move left, this device is able to do so, as shown in FIG. 4B. Once the movable robot is determined, that robot is moved out of the way, such as all the way to the left (step 516), as shown in FIG. 4C. Finally, the controller determines whether or not more than one device remains to be ordered (step 518). The controller should be able to determine this simply, because it will know the number of devices being ordered; it can subtract one for every time the order of another device is determined. If only one device remains, that device is designated the rightmost device (step 520) and the process terminates. Otherwise, steps 514-518 are repeated as many times as necessary until only one device remains. In the exemplary situation of FIGS. 4A-4D, the process would return to step 514, where only robot 410 would be able to move left, as shown in FIG. 4D. I would then be determined that robot 410 is the next most leftmost robot. At this point, only robot 412 would then remain; this robot would be designated the rightmost and the process would terminate.

Sequencing Process—Multiple Robots, Version II

Figure 6:
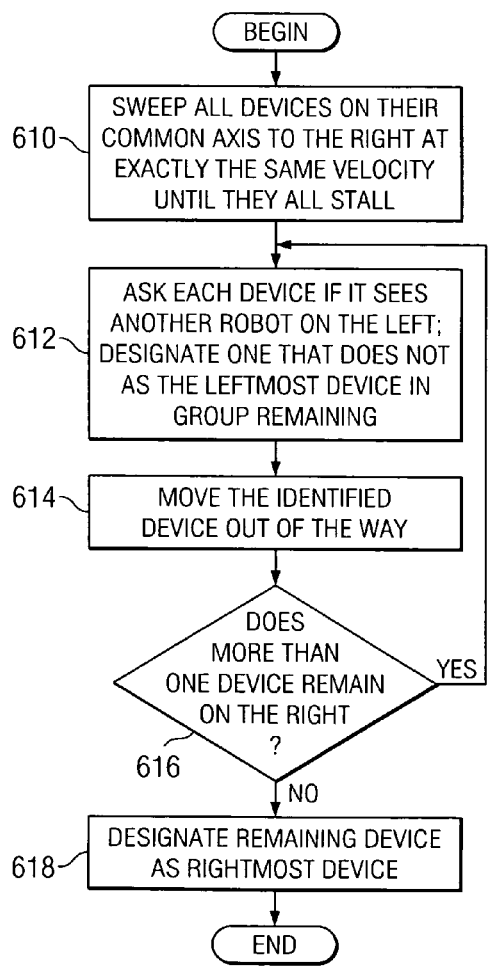
FIG. 6 depicts a flow chart with process steps for implementing an alternate embodiment of the invention.

An alternate version of the inventive method will now be discussed with reference to FIG. 6. In this version, which is a variation on the method described above, each robot is equipped with 'bump' sensors that would be triggered when the robot bumped into another robot, but would not be triggered when it bumped into an end-stop. Although this process requires sensors for each robotic device, this is still an improvement over the need for each robot to have a hardwired position within the group of robotic devices. In this alternate method, the process begins, as before, with instructing all devices to move to the right as far as possible (step 610). Then, each device is queried whether or not it detects another robot on its left (step 612). Because only one of the robots in the group will not detect another robot on its left, e.g. robot 408, this robot can be identified and designated the leftmost robot. This leftmost robot is moved out of the way, e.g., all the way to the left (step 614). The controller then checks whether more than one robot remains to be ordered (step 616). If so, the process returns to step 612 and repeats steps 612 through 616 until only one device remains. This device is designated the rightmost device of the group (step 618) and the ordering is completed.

Sequencing Process—Multiple Robots, Version III

Figure 7:
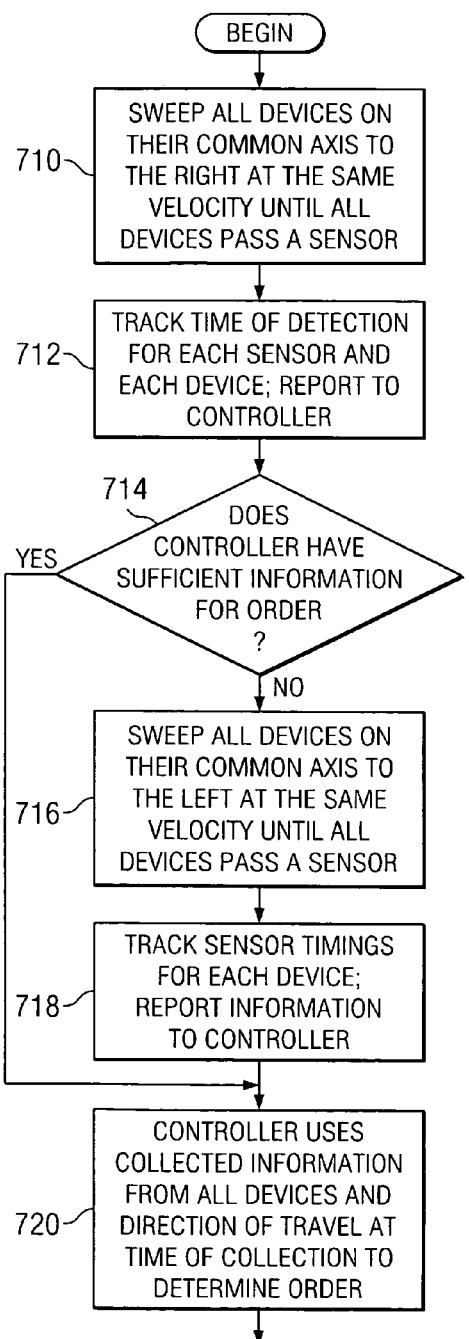
FIG. 7 depicts a flow chart with process steps for implementing a further alternate embodiment of the present invention.

A further variation on the disclosed method will now be discussed with reference to FIG. 7, which discloses a flowchart of the actions necessary, according to an exemplary embodiment of the invention. In this process, one or more sensors are used; but they are positioned at a point along the line of travel, e.g., at point A of FIG. 4A. The sensors can be any type of sensor that will detect the passage or presence of a robotic device. The robotic devices are all commanded to move to their right a given distance (step 710). The distance chosen for this movement should be enough that most, if not all of the robots, pass at least one sensor, and can be chosen to drive all robots all the way to the right. While the movement is taking place, the controller notes the time that each sensor is triggered and which sensor was triggered at that time. At the same time, each robot is instructed to note the time that it passes a sensor and to pass this information to the controller (step 712). If every robot passed a sensor during the movement of step 710, the controller may have enough information at this point to determine the order of the robots. The controller then makes a determination whether it has enough information (step 714). If it does, the process skips to step 720, where the controller uses its collected information to determine the order. Otherwise, the controller instructs the robots to move to the left a given distance, preferably until all robots have passed at least one sensor (step 716). Again, both the controller and the robots themselves each note the time of an encounter with a sensor and the robots report this information to the controller (step 718). Finally, the controller uses the collected data to determine the order of the robots, using the stored information (step 720).

Sequencing Process—Multiple Robots, Version IV

Figure 8:
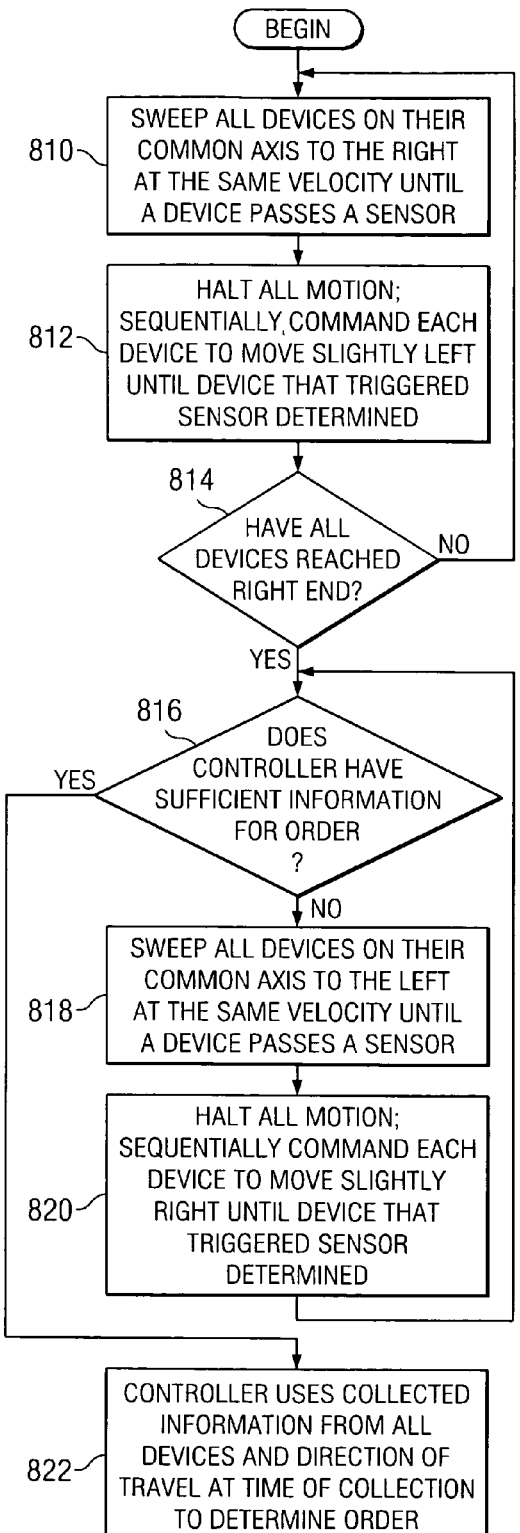
FIG. 8 depicts a flow chart with process steps for implementing a further alternate embodiment of the present invention.

Yet another algorithm for the detection of the order of a group of robots is a variation to the algorithm just discussed. In this process, shown in FIG. 8, the controller again instructs all robots to move to the right until a device passes a sensor (step 810). When a sensor is encountered, all robotic motion is stopped. The controller then commands each robotic device sequentially to move a small direction to the left. In this manner, the controller determines which device triggered the sensor. Once this has been determined, the controller can determine whether all robots have moved far enough that they will be against the endpoint (step 814). If not, the controller returns to step 810 and continues moving the devices and monitoring when a sensor is passed (step 812). When all devices have moved to the right as far as they will go, the controller determines whether it has enough information to completely order the robot devices (step 816). If it does, the controller uses the collected information to determine the order of the robots (step 822). Otherwise, the controller begins sweeping the devices to the left until a robot crosses a detector (step 818). Again, the controller halts movement and sequentially commands each device to move slightly to the right to determine which robotic device triggered the sensor (step 820). The flow then returns to step 816, where the controller determines if it has enough information to order the robots. If it does not, it will continue to sweep robots left (step 818) and determine which robot causes each encounter with a sensor (step 820). When the control can finally answer 'yes' to the question of sufficient information (step 816), the process goes to step 822, where the controller processes the information it has and determines the order and the process is complete.

The various embodiments of the present invention allow the use of generic robots without any predetermined order status. This allows new robots to be loaded in any order without concern for the relative positions of the robots, because the controller is able to determine the order by the innovative process.

The description of the present invention has been presented for purposes of illustration and description, and is not intended to be exhaustive or limited to the invention in the form disclosed. Many modifications and variations will be apparent to those or ordinary skill in the art. For example, instead of sensors detecting the presence of robots, a camera can be mounted on the body of the library structure to "read" the identification number of the robots in the vicinity. Alternately, inexpensive cameras can be mounted on each robot to detect the passing of given points of either the structure or of specific tapes whose position is known. The embodiments were chosen and described in order to best explain the principles of the invention, the practical application, and to enable others of ordinary skill in the art to understand the invention for various embodiments with various modifications as are suited to the particular use contemplated.

What is claimed is:

1. A media library, comprising:
   a plurality of computer-readable media units;
   a device configured to read or write the media units;
   a plurality of robots constrained to move along a common axis of motion, wherein each robot has sensors disposed on opposite sides of the robot to indicate when the robot is touching another robot; and
   a controller connected to communicate with and control the plurality of robots;
   wherein the controller identifies relative positions of the plurality of robots on the common axis of motion by a series of commands and responses, wherein the series of commands and responses comprises:
      first instructions for directing the plurality of robots to move in a first direction as far as possible;
      second instructions for sequentially querying the plurality of robots regarding the presence of another robot on a first side that is opposite the first direction until a first one of the plurality of robots does not detect the presence of another robot on the first side;
      third instructions for providing an order designation for the first one of the plurality of robots and moving the first one of the plurality of robots away from ones of the plurality of robots that have not received an order designation;
      fourth instructions for performing the sequentially querying step and the providing step repeatedly until only a single one of the robots does not have an order designation; and
      fifth instructions for designating an order for the single one of the robots.

2. The media library of claim 1, wherein the media library is a robotic tape library.

3. The media library of claim 1, wherein the common axis of motion is a rail along which the plurality of robots are constrained to move.

4. The media library of claim 1, wherein the common axis of motion is substantially horizontal.

5. A method for identifying relative positions of each of a plurality of robots that are constrained to move along a common axis of motion, the method comprising the steps of:
   instructing each of the plurality of robots to make a series of motions that are designed to determine relative positions;
   collecting and storing information regarding positions of the plurality of robots; and
   using the information to determine relative positions of the plurality of robots;
   wherein the instructing and collecting steps comprise:
      providing a sensor that is connected to detect the passage of ones of the plurality of robots;
      instructing each of the plurality of robots to move in a first direction while collecting information regarding when a robot passes the sensor;
      collecting information from each of the plurality of robots regarding a time when each of the robots passes the sensor;
      instructing each of the plurality of robots to move in a second direction that is opposite the first direction while collecting information regarding when a robot passes the sensor when all of the plurality of robots have not passed the sensor; and
      using the information to designate an order for the plurality of robots.

6. The method of claim 5 wherein the common axis of motion is non-vertical.

7. The method of claim 5 wherein the plurality of robots are provided with a media library.

8. The method of claim 5 wherein the common axis of motion is a rail.

9. A computer program product on a computer readable media, the computer program product comprising instructions for identifying relative positions of a plurality of robots on a common axis of motion using a series of commands to and responses from the plurality of robots; wherein the instructions comprise:
   first instructions for repetitively performing the following three steps until all of the robots have passed a sensor or are unable to move further:
      (a) instructing each of the plurality of robots to move in a first direction until one of the plurality of robots passes the sensor;
      (b) instructing each of the plurality of robots to stop moving;
      (c) sequentially instructing each of the plurality of robots to move in a second direction opposite to the first direction a short distance until a given one of the robots is determined to the one that passed the sensor;
   second instructions for, if further information is needed to determine an order of the robots, repetitively performing the following three steps until enough information is collected to determine an order:
      (d) instructing each of the plurality of robots to move in the second direction until one of the plurality of robots passes the sensor;
      (e) instructing each of the plurality of robots to stop moving;
      (f) sequentially instructing each of the robots to move in the first direction a short distance until a given one of the robots is determined to be the one that passed the sensor; and
   designating an order for the plurality of robots.

10. The computer program product of claim 9, wherein the common axis of motion is a linear rail.

11. The computer program product of claim 9, wherein the plurality of robots are configured to engage a data cartridge.

12. The computer program product of claim 11, wherein only one sensor is provided.

13. The computer program product of claim 9, wherein the plurality of robots are provided with a media library.

14. The computer program product of claim 13 wherein one sensor is provided.

15. A media library, comprising:
- a plurality of computer-readable media units;
- a device configured to read or write the media units;
- a plurality of robots constrained to move along a common axis of motion, wherein only a first robot and a second robot of the plurality of robots move on a given segment of the common axis of motion, and
- a controller connected to communicate with and control the plurality of robots;
- wherein none of the plurality of robots contains an indicator of position relative to each other; and
- wherein the controller identifies relative positions of the plurality of robots on the common axis of motion by a series of commands and responses, wherein the series of commands and responses comprises:
  - (a) instructing the first robot to move in a first direction until it stalls;
  - (b) instructing the second robot to move in a second, opposite direction until it stalls;
  - (c) receiving a respective distance moved from the first and the second robots after completion of steps (a) and (b);
  - (d) instructing the first robot to move in the second direction a given distance;
  - (e) instructing the second robot to move in the second direction a given distance;
  - (f) receiving a respective distance moved from the first and the second robots after completion of steps (d) and (e); and
  - (g) designating an order for each of the first robot and the second robot.

16. The media library of claim 15 wherein the common axis of motion is substantially horizontal.

17. The media library of claim 15 wherein the plurality of robots are configured to engage a data cartridge.

18. The media library of claim 17 wherein the data cartridge contains a media for storing data.

19. The media library of claim 15 wherein the media library is a robotic tape library.

20. The media library of claim 15 further comprising a second plurality of robots, wherein the controller identifies relative positions of the second plurality of robots by a series of commands and responses, wherein the series of commands and responses comprises:
- first instructions to direct each of the second plurality of robots to move in a first direction as far as possible;
- second instructions to direct each of the second plurality of robots to hold their position;
- third instructions to sequentially direct each of the second plurality of robots to move in a second direction that is opposite the first direction until a first one of the second plurality of robots is able to move in the second direction;
- fourth instructions to provide an order designation for the first one of the second plurality of robots and to move the first one of the plurality of robots away from ones of the second plurality of robots that have not received an order designation;
- fifth instructions to perform the third instructions and the fourth instructions repeatedly until only a single member of the second plurality robots does not have an order designation; and
- sixth instructions for designating an order for the single member of the second plurality of robots.

* * * * *